Patented Apr. 15, 1941

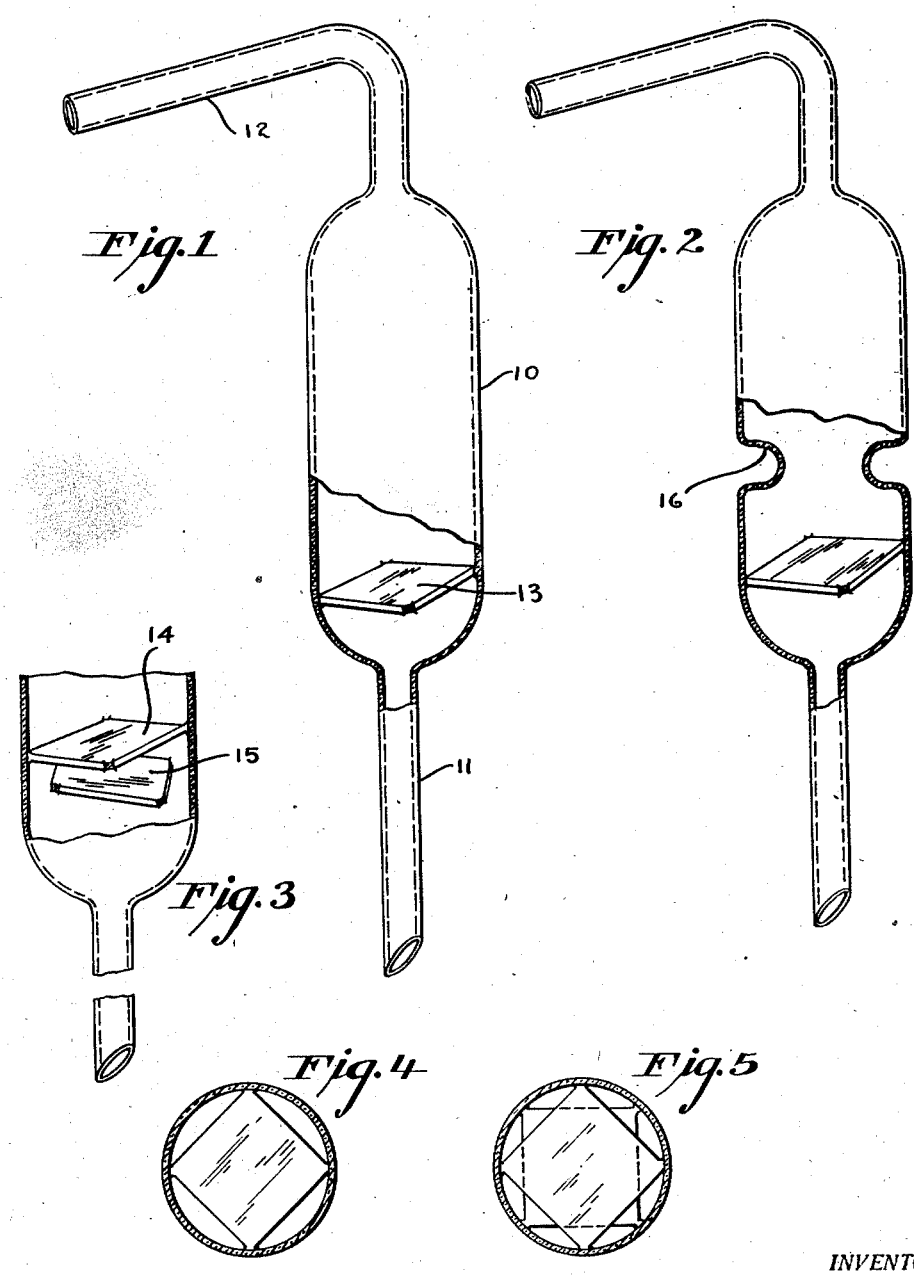

2,238,174

UNITED STATES PATENT OFFICE 2,238,174

GLASS DISTILLING HEAD

Everett F. Kelm, Corning, N. Y., assignor to Corning Glass Works, Corning, N. Y., a corporation of New York Application January 3, 1939, Serial No. 249,148

2 Claims. (Cl. 183—99)

This invention relates to glass apparatus and particularly to distilling heads for fractional distillations.

Prior distilling heads of the restricted-flow type possess the disadvantage that they do not permit the complete and efficient drainage of the condensate which collects therein and consequently offer appreciable resistance to the flow of vapors therethrough. Such heads are difficult to clean properly. Prior distilling heads of the open type have insufficient provision for entrapping liquid or solid material which might tend to be carried along with the vapor stream.

The object of this invention is to produce a distilling head which will efficiently entrap condensate and entrained material and return the same to the still without offering substantial resistance to the flow of vapor nor tending to drip after the completion of distillation.

In its broader aspect the invention consists in a distilling head or fractionating condenser which comprises a tubular glass body within which a baffle plate is supported transversely of the bore of the body, as is hereinafter more fully described, claimed in the appended claims and illustrated in the accompanying drawing in which:

Fig. 1 is a side view of a glass distilling head made in accordance with my invention and partly broken away to show the interior thereof;

Fig. 2 is a side view, partly in section, of a similar glass distilling head modified in accordance with my invention;

Fig. 3 is a fragmentary side view of a glass distilling head further modified in accordance with my invention;

Fig. 4 is a transverse sectional view of a glass distilling head showing the embodiment of my invention, which is illustrated in Fig. 1; and Fig. 5 is a transverse sectional view of a glass distilling head showing the modification of my invention which is illustrated in Fig. 3.

As shown in Fig. 1, the invention comprises a tubular glass body 10 which is drawn down at each end and to which is attached at the one end a tubular glass stem 11 and at the other end a glass delivery tube 12, both of which communicate with the hollow interior of the body 10. Within the body 10 a baffle plate 13 is positioned transversally of the bore and preferably at a very slight angle to it. The plate 13 in the present embodiment is substantially square and the corners thereof lay against the wall of the tubular body 10 and are sealed thereto as shown in Fig. 4. Although a square plate is preferable as being of simple construction, it may be of polygonal shape with any desired number of sides provided that at least two corners thereof contact the walls of the body 10 and are sealed thereto.

Instead of a single plate the tubular body may contain a plurality of plates 14 and 15 likewise positioned transversally of the bore of the body and preferably at a slight angle thereto as shown in Fig. 3. In this embodiment of the invention alternate plates are turned through about 45 degrees to the intermediate plates with respect to the bore of the tubular body as an axis, as shown in Fig. 5. In other words, alternate plates are turned with respect to one another to intersect direct paths through the bore.

As a further modification of the invention, the tubular glass body may have an annular constriction 16 in its wall, as shown in Fig. 2.

In use my distilling head is supported preferably in a vertical position with the stem 11 entering and communicating with a still (not shown). Vapors from the still pass through the stem and impinge upon the lower face of the plate 13 which stops and entraps any liquid or solid particles which may have been carried along with the vapor. The vapor freed from entrained material passes freely around the plate and upwardly through the space provided therefor between the wall of the tubular body 10 and the sides of the glass plate. The plate, being at a slight angle to the horizontal, ensures that entrapped material and condensate will be returned rapidly and efficiently to the still. Eddy currents which naturally occur in the vapor stream after it has passed around the glass plate may be augmented or amplified by means of the annular constriction 16 shown in Fig. 2. This increases the fractionating action of the distilling head. Further increase in efficiency may be obtained by providing a plurality of plates, as shown in Figs. 3 and 5, or a plurality of alternately spaced plates and annular constrictions.

I claim:

1. A glass distilling head comprising a tubular glass body to the ends of which are attached respectively a tubular glass stem and a glass delivery tube, a substantially square glass baffle plate positioned transversally of the bore of the tubular body near the stem, the corners of the plate being fused to the wall of the body one diagonal of the plate being substantially at a right angle to the bore of the body and the other diagonal being at less than a right angle to the bore.

2. A glass distilling head comprising a substantially straight tubular glass body to the ends of which are attached respectively a tubular glass stem and a glass delivery tube, a polygonal glass baffle plate positioned transversally of the bore of the tubular body and at a slight angle to a plane at right angles to the axis of the body, at least two corners of the plate being fused to the wall of the body one of the fused corners being spaced closer to the stem than any other corner of the plate.

EVERETT F. KELM.